(12) United States Patent
Olver et al.

(10) Patent No.: US 11,530,710 B2
(45) Date of Patent: Dec. 20, 2022

(54) AIRCRAFT PNEUMATIC SYSTEM

(71) Applicant: PRATT & WHITNEY CANADA CORP., Longueuil (CA)

(72) Inventors: Bryan W. Olver, Collingwood (CA); Daniel Alecu, Brampton (CA); Nick Stina, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 270 days.

(21) Appl. No.: 16/774,471

(22) Filed: Jan. 28, 2020

(65) Prior Publication Data
US 2021/0231050 A1 Jul. 29, 2021

(51) Int. Cl.
| | | |
|---|---|---|
| *F15B 19/00* | (2006.01) | |
| *F02C 9/18* | (2006.01) | |
| *G05D 7/00* | (2006.01) | |
| *G01M 3/28* | (2006.01) | |
| *F15B 20/00* | (2006.01) | |
| *B64D 15/02* | (2006.01) | |
| *F01D 9/06* | (2006.01) | |

(52) U.S. Cl.
CPC ............ *F15B 19/005* (2013.01); *F02C 9/18* (2013.01); *F15B 20/005* (2013.01); *G01M 3/2815* (2013.01); *G05D 7/00* (2013.01); *B64D 15/02* (2013.01); *F01D 9/065* (2013.01); *F15B 2211/6323* (2013.01); *F15B 2211/857* (2013.01)

(58) Field of Classification Search
USPC ........................................ 73/40.5 R, 861.63
See application file for complete search history.

(56) References Cited

U.S. PATENT DOCUMENTS

| | | | |
|---|---|---|---|
| 4,355,654 A * | 10/1982 | Levesque ............ | G01M 3/2815 137/460 |
| 5,155,991 A | 10/1992 | Bruun | |
| 5,993,163 A | 11/1999 | Iden | |
| 6,948,325 B1 | 9/2005 | Axe et al. | |
| 7,036,319 B2 | 5/2006 | Saunders et al. | |
| 8,033,118 B2 | 10/2011 | Monteiro et al. | |
| 8,511,179 B2 | 8/2013 | Kelnhofer et al. | |
| 10,046,859 B2 | 8/2018 | Jones | |
| 10,100,730 B2 | 10/2018 | Huppe et al. | |
| 2011/0247432 A1 * | 10/2011 | Kelnhofer ............... | B64D 13/00 73/861.351 |
| 2017/0261383 A1 * | 9/2017 | Sommervogel .......... | G01K 7/16 |
| 2018/0334965 A1 | 11/2018 | Ortiz et al. | |
| 2020/0223405 A1 * | 7/2020 | Szklar ................... | B60T 13/683 |

* cited by examiner

*Primary Examiner* — Nathaniel J Kolb
(74) *Attorney, Agent, or Firm* — Norton Rose Fulbright Canada LLP

(57) ABSTRACT

An aircraft pneumatic system including a pneumatic actuator arranged to operate at a pressure value at least equal to a pressure threshold, a line fluidly connected between a pneumatic source and the pneumatic actuator, and a venturi disposed upstream of the line and downstream of the pneumatic source. The venturi is configured to receive a source flow from the source at a mass flow rate, the mass flow rate being between a lower, nominal flow rate value and a higher, graded flow rate value. The venturi is sized such that when the mass flow rate is at the nominal flow rate value, a line pressure inside the line corresponds to a source pressure upstream of the venturi, and when the mass flow rate to the venturi is at the graded flow rate value, the line pressure is less than the source pressure.

7 Claims, 3 Drawing Sheets

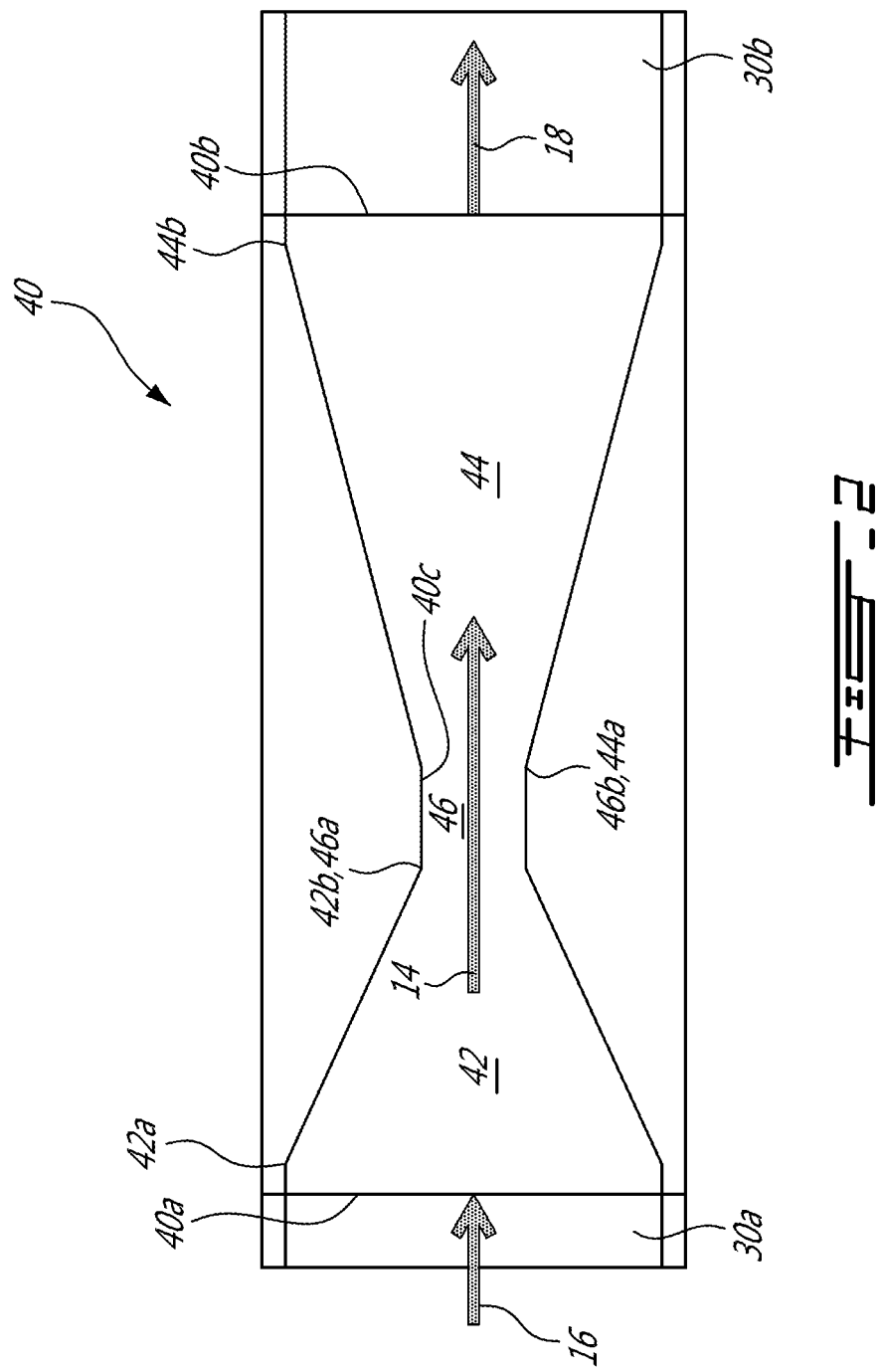

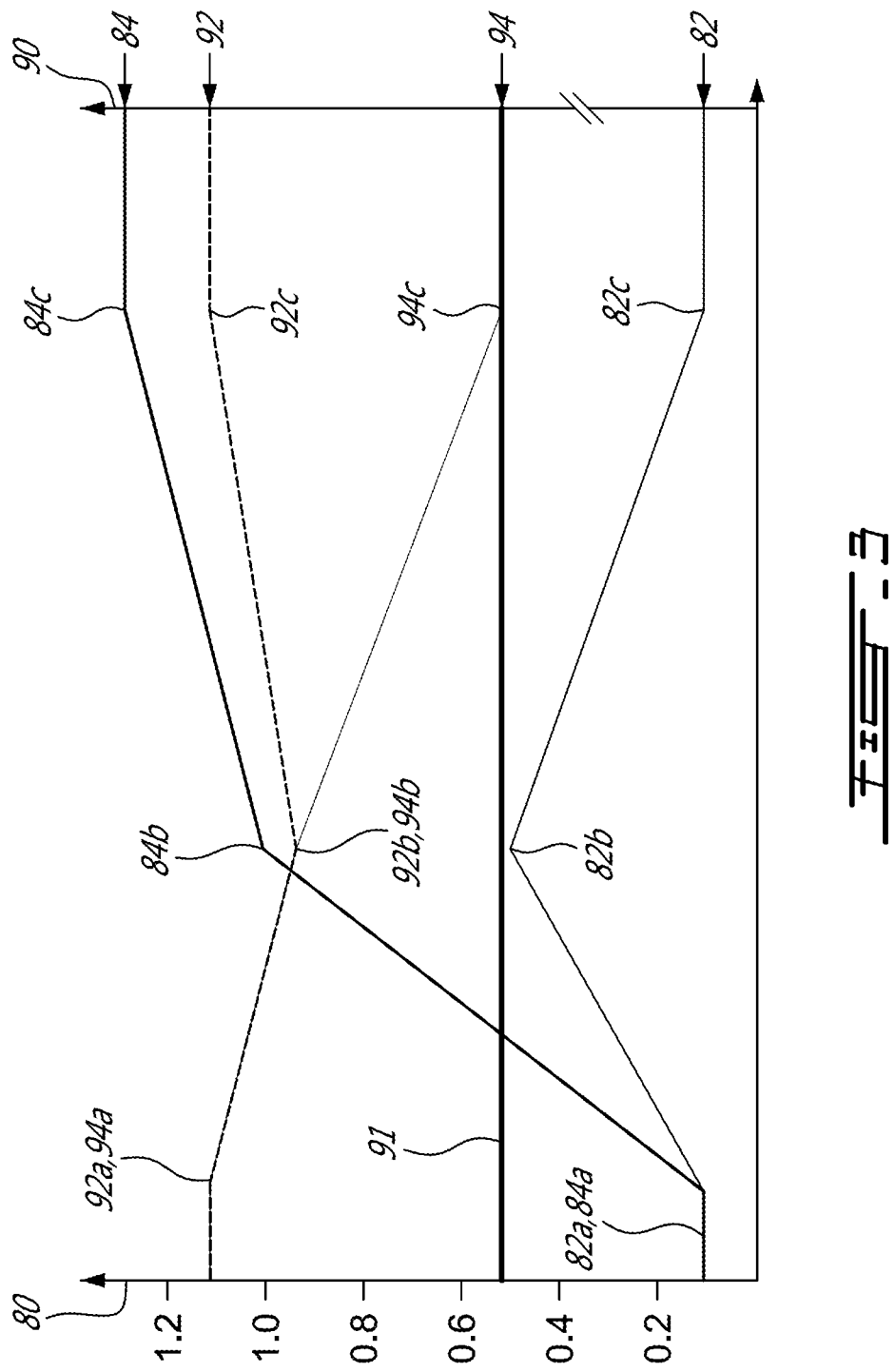

AIRCRAFT PNEUMATIC SYSTEM

TECHNICAL FIELD

The application relates generally to pneumatic systems and, more particularly, to aircraft pneumatic systems.

BACKGROUND

Aircraft equipped with gas turbine engines are conventionally designed to take advantage of the considerable amounts of high-pressure and high-temperature air flowing inside the engines to power several pneumatic systems on board. Indeed, in the case of turbofan engines, a material ratio of the air flowing inside the engine bypasses its core, and portion of this bypass airflow may be bled off to supply systems tasked for providing ice protection, environmental temperature control, and/or pressurization, among others. Bleed air taken from the engine core may for example have a pressure and a temperature greater than those outside of the engine by several orders of magnitude. However, not all aircraft pneumatic systems are designed to accept air at such high pressures and temperatures, and some of the equipment surrounding such systems may not be adapted to withstand heat emanating therefrom.

SUMMARY

There is accordingly provided an aircraft pneumatic system comprising: a pneumatic actuator arranged to operate at a pressure value at least equal to a pressure threshold; a line fluidly connected between a pneumatic source and the pneumatic actuator; and a venturi disposed upstream of the line and downstream of the pneumatic source, the venturi configured to receive a source flow from the source at a mass flow rate, the mass flow rate being between a nominal flow rate value and a graded flow rate value, the graded flow rate value greater than the nominal flow rate value; the venturi sized such that when the mass flow rate is at the nominal flow rate value, a line pressure inside the line corresponds to a source pressure upstream of the venturi, and when the mass flow rate to the venturi is at the graded flow rate value, the line pressure is lesser than the source pressure.

There is also provided a venturi for an aircraft pneumatic system comprising: a contraction and a diffuser downstream thereof, the venturi configured to be fluidly connectable to the aircraft pneumatic system between a source and a line thereof, the line fluidly connected to a pneumatic actuator of the aircraft pneumatic system arranged to operate at a pressure of a value at least equal to a pressure threshold; the venturi configured to receive a source flow from the source at a mass flow rate, the mass flow rate being between a nominal flow rate value and a graded flow rate value, the graded flow rate value greater than the nominal flow rate value; the venturi sized such that when connected to the pneumatic system, upon the mass flow rate into the venturi being at the nominal flow rate value, a line pressure inside the line corresponds to a source pressure upstream of the venturi, and upon the mass flow rate into the venturi being at the graded flow rate value, the venturi causes the line pressure to be lesser than the source pressure.

There is further provided a method for sensing a fluid leakage occurring out of a line of an aircraft pneumatic system, the method comprising: flowing a fluid from a source of the aircraft pneumatic system into a venturi downstream thereof at a pressure of a nominal pressure value and a mass flow rate of between a nominal flow rate value and a graded flow rate value; using the venturi to flow the fluid via the venturi into the line downstream thereof, the venturi configured such that the pressure inside the line is at the pressure threshold upon the mass flow rate being at the graded flow rate value, and sensing the pressure inside the line, the pressure inside the line being at the pressure threshold indicative of the fluid leakage occurring in the line.

BRIEF DESCRIPTION OF THE DRAWINGS

Reference is now made to the accompanying figures in which:

FIG. 2 is a cross-sectional view of a venturi of the pneumatic system of FIG. 1, taken along line II-II of FIG. 1; and FIG. 3 is a graph illustrating flow velocities inside the venturi of FIG. 1 as a function of a position inside the venturi.

DETAILED DESCRIPTION

Figure 1:
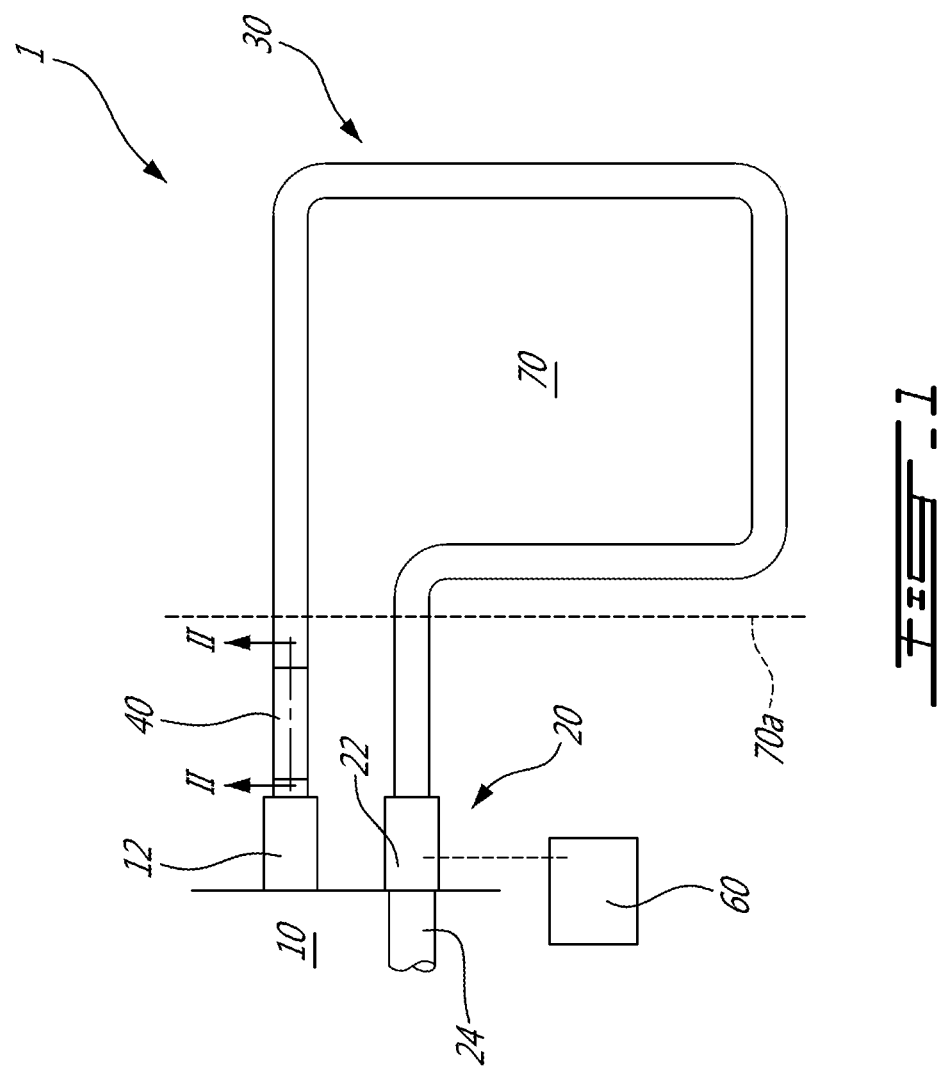
FIG. 1 is a schematic representation of a pneumatic system according to embodiments of a first aspect of the present technology.

FIG. 1 illustrates a pneumatic system 1 of a type provided for use with a gas turbine engine of an aircraft. The pneumatic system 1 generally comprises a pneumatic source 10 of a pressurized fluid, a pneumatic actuator 20, a pneumatic line 30 in fluid communication between the pneumatic source 10 and the pneumatic actuator 20, and a venturi 40 fluidly connected to the pneumatic line 30. For brevity, the above-mentioned components will now be referred to as the source 10, the actuator 20, the line 30 and the venturi 40.

In this embodiment, the source 10 is an engine-side pressure source of a bleed air system of the aircraft. The line 30 is thus arranged for taking bleed air from the source 10, an outlet 12 of which is shown connected to an inlet of the line 30. The source 10 may include a pressure-regulating valve (not shown) configured to limit a pressure of the air supplied by the source 10 (i.e., a source pressure), in one possible exemplary embodiment, to a value from 40 to 60 psi, and more particularly in one specific embodiment about 50 psi (i.e., a nominal pressure value). Proximate the source 10, a flow of bleed air flowing into the line 30 may have, in an exemplary embodiment, a temperature of a value from 150 to 250 C (i.e., a nominal temperature value), move at a flow velocity of a value less than Mach 1.0 (i.e., a nominal velocity value) and at a mass flow rate of a value less than 1.0 ppm (i.e., a nominal flow rate value).

More particularly, in one specific embodiment, the nominal temperature value may be of about 200 C, the nominal velocity value may be of about Mach 0.1, and the nominal flow rate value may be of about 0.2 ppm. Such flow may be described as a nominal flow. It is to be understood that each of these values may be modified by ±10% and still fall within the scope of each of these values/ranges. As such, unless stated otherwise herein, any value recited in the present description as being "about X" is understood to include ±10% of the value X while remaining within the disclosed range/value.

The source 10 may be arranged for supplying air to a plurality of systems, some of which may be operable upon receiving a supply of air having a pressure and/or a temperature lower than that at the source 10. For example, the actuator 20 according to embodiments of the present technology may be an engine cowl anti-ice system including a valve 22 and an anti-ice ductwork 24 downstream thereof.

The valve 22 is fluidly connected between an outlet of the line 30 and the anti-ice ductwork 24. The anti-ice system may be configured to be operable upon air flowing into the anti-ice ductwork 24 via the valve 22 at a temperature of a value from 150 to 250 degrees C., and more particularly in one specific embodiment about 200 degrees C. The valve 22 has an operative position (i.e. an open position) in which it allows fluid communication between the line 30 and the anti-ice ductwork 24, and an inoperative position (i.e., a closed position) in which it closes the fluid communication. The valve 22 is in this case of a pressure-operated type. The valve 22 is configured to be operative (i.e., to move to or to remain into the open position) upon the pressure in the line 30 (i.e. a line pressure) being greater than a pressure threshold, and to be inoperative (i.e., to move or to remain into the closed position) upon the line pressure being equal to or less than the pressure threshold. In one specific embodiment, this pressure threshold may be about 40 psi. In other embodiments, the pressure threshold may be of a value between about 20 and about 60 psi.

The pneumatic system 1 also includes a pressure-monitoring means to assist in detecting a leakage occurring from the line 30 and in signaling a need to undertake corrective actions. The pressure-monitoring means includes a controller 60 electronically connected to the valve 22 and a display panel (for example a panel disposed in a cockpit of the airplane having indicator lights) electronically connected to the controller 60. The valve 22 is arranged for sending a signal indicative of its position (whether open or closed) to the controller 60. In embodiments, the controller 60 is configured to indicate the position of the valve 22 and/or an occurrence of the leakage via the display panel. In this embodiment, the pressure-monitoring means and the valve 22 can be described as together forming a pressure management system of the aircraft provided to close the line 30 in the event of the leakage occurring in the bleed air system upstream of the valve 22. Such leakage causing the line pressure to decrease from the nominal pressure value to the pressure threshold or below may be described as a high-loss leakage, i.e., a leakage rendering the pressure in the line 30 insufficient for the actuator 20 to operate. Such high-loss leakage may correspond to a high-loss leakage flow rate of a value greater than about 0.25 ppm, and in some exemplary embodiments of a value from 0.25 to 1.0 ppm.

The pneumatic system 1 may also be said to be arranged for managing a transfer of heat that may occur via the line 30. The line 30 is routed in the aircraft between the source 10 and the actuator 20 so as to promote the transfer of heat away from the air conveyed by the line 30 and toward media surrounding the line 30. The line 30 may thus be described as a cooling line 30. In this embodiment, the line 30 is routed within a fan bypass flow path of the gas turbine engine so as to be exposed to engine fan bypass air flow.

As the air in this fan bypass air flow has a temperature typically less than that at the source 10, convection occurring alongside a peripheral wall of the line 30 may cool the line 30 and in turn cool the bleed air conveyed inside it. The line 30 may be constructed of a material having a high thermal conductivity such as copper, among other possible materials. Further, it should be noted that the venturi 40 may also be arranged so as to transfer heat from inside to outside thereof, and may thus be said to form a part of the cooling line 30. In some embodiments, the line 30 may be arranged so as to attain a desired heat transfer rate, i.e., a desired heat flux per unit of length of the line 30. In some such embodiments, the line 30 may also be arranged so as to have a desired weight per unit of length of the line 30.

A by-product of some of the above-mentioned heat transfer-promoting characteristics is that the line 30 has mechanical resistance characteristics that should be taken into account to ensure a long lifespan. For instance, any structural imperfection in the line 30 could weaken the line 30 and lead to further deterioration under stress, whether arising from pressure and temperature inside thereof or from vibration generated by the gas turbine engine connected thereto. In the event of a minor breach in the line 30, air may leak therefrom. In such cases of low-loss leakage, the pressure in the line 30 may be at a value between the nominal pressure value and the pressure threshold. Hence, such leakage could in some instances remain undetected by the pressure monitoring system 60 as it would not suffice to induce a failure of the actuator 20. However, such a small leakage may still cause elements 70 of the aircraft surrounding the line 30 to heat up undesirably. Some such elements 70, for example bypass ducts, may be constructed of heat-sensitive materials, such as carbon fiber and epoxy. Moreover, such elements 70 may be located in a remote area 70a or simply not be subject to routine inspection. Such elements 70 may be graded as capable of withstanding temperatures no greater than a certain temperature threshold or a heat transfer rate no greater than a certain heat transfer threshold, based on which a graded leakage rate threshold may be determined, at which the leakage from the line 30 would induce such conditions to the elements 70. The graded leakage rate threshold is less than the high-loss leakage flow rate, for example greater than 0.25 ppm in one embodiment, and about 0.25 in one specific embodiment. Therefore, absent the venturi 40 according to the present technology, early detection of the leakage may not be possible.

As will now be described hereinbelow, the venturi 40 of the pneumatic system 1 is configured to cooperate with the pressure monitoring system 60 so as to form a means to detect such leakages occurring, even when the line pressure inside the line 30 remains at a value greater than the pressure threshold, for example upon the mass flow rate in the line 30 increasing from the nominal flow rate value by the graded leakage rate threshold.

Referring to FIG. 2, the venturi 40 may be installed at a location along the line 30 that is readily accessible for visual inspection and servicing of the line 30. In this embodiment, the venturi 40 is located as close as possible to the source 10. In some embodiments, an upstream portion of the line 30 may be disposed between the source 10 and the venturi 40, the latter located upstream of a remainder of the line 30 deemed prone to small-amplitude failures. The venturi 40 has an interior extending between an inlet 40a connected to the source outlet 12 and an outlet 40b connected to the line 30. The interior of the venturi 40 is surrounded by a peripheral wall 40c. At the inlet 40a and at the outlet 40b, the peripheral wall 40c defines an inner diameter corresponding to that of the line 30. The peripheral wall 40c is shaped so as to define a converging section (i.e., a contraction 42), a diverging section (i.e., a diffuser 44) and a throat 46 of the venturi 40 between the contraction 42 and the diffuser 44. The contraction 42 has an upstream end 42a proximate the inlet 40a, and a downstream end 42b spaced away therefrom. The contraction 42 narrows down as it extends from its upstream end 42a to its downstream end 42b. The diffuser 44 has a downstream end 44b proximate the outlet 40b and an upstream end 44a spaced away therefrom. The diffuser 44 broadens as it extends from its upstream end 44a to its downstream end 44b. In this embodiment, both the contraction 42 and the diffuser 44 have continuously tapered shapes, although of different taper angles. In yet other embodiments, the contraction 42 and the diffuser 44 may respectively be formed of a plurality of portions tapering at different taper angles. The throat 46 is an interface between the contraction 42 and the diffuser 44 defining a choke orifice, i.e., an orifice having a smallest diameter formed by the peripheral wall 40c. In this embodiment, the contraction 42 and the diffuser 44 are spaced away from one another such that the throat 46 has a straight, cylindrical shape. The throat 46 thus has an upstream end 46a contiguous with the downstream end 42b of the contraction 42, and a downstream end 46b contiguous with the upstream end 44a of the diffuser 44. In other embodiments, the throat 46 may otherwise form a continuously curved transition between the contraction 42 and the diffuser 44, such that the peripheral wall 40c has an hourglass shape.

Operational characteristics of the venturi 40 will now be described with reference to FIG. 3. The source 10 is configured to provide a flow of pressurized fluid to the actuator 20 via the line 30 such that, under normal operating conditions, the line pressure inside the line 30 is greater than the pressure threshold and equal to or less than the nominal pressure value. Inside the venturi 40, the flow may be described as a venturi flow 14 (FIG. 2) having a venturi velocity 80 and a venturi pressure 90 that may vary across the length of the venturi. As mentioned above, the venturi 40 may be disposed downstream of the source 10 yet proximate thereto, such that the flow upstream of the venturi 40 can be described as source flow 16. Conversely, the flow downstream of the venturi 40 (i.e., in the line 30) can be described as a line flow 18. The venturi 40 is configured to impart the line flow 18 with certain property values that may vary based to those of the source flow 16 received by the venturi 40. For instance, absent any leakage in the line 30, the source flow 16 may be described as a nominal source flow (i.e., a flow having properties corresponding to those of the nominal flow), and the venturi flow 14 may be described as a nominal venturi flow. The venturi 40 is configured so that upon receiving the nominal source flow, as shown by curve 82, the venturi velocity 80, accelerates in the contraction 42 from the nominal velocity value 82a to a value 82b (e.g. of about Mach 0.5 in one specific embodiment) and decelerates in the diffuser 44 back to the nominal velocity value (82c) such that a nominal line flow 18a downstream of the venturi 40 has a nominal line velocity and a nominal line pressure corresponding to those upstream of the venturi 40. In the venturi 40, the venturi pressure 90, as shown by curve 92, decreases 92a in the contraction 42 to a reduced pressure value (92b) less than the nominal pressure value yet greater than the pressure threshold (91), and increases in the diffuser 44 so as to recover the nominal pressure value (92c).

On the other hand, upon the leakage occurring in the line 30 at the graded leakage rate threshold, the venturi 40 induces a different effect on the air conveyed therein. Under such conditions, the venturi flow 14, the source flow 16 and the line flow 18 may respectively be described as graded venturi, source and line flows. The graded source flow moves at a graded source velocity value of from Mach 0.1 to 0.3 and at a graded flow rate value of from 25 to 65 ppm (corresponding to the sum of the nominal flow rate value and the graded leakage rate threshold). In one specific embodiment, the graded source velocity value is of about Mach 0.2 and the graded flow rate value is of about 45 ppm. A graded source pressure value upstream of the venturi 40 is of about 50 ppm. The venturi 40 is configured so that upon receiving the graded source flow, the venturi velocity 80 shown by curve 84 accelerates in the contraction 42 from the graded velocity value (84a) to a sonic velocity value, i.e., of about Mach 1, (84b), and accelerates to a supersonic velocity value, i.e., greater than Mach 1 (84c). In the venturi 40, the venturi pressure 90 shown by curve 94 decreases from the nominal pressure value (94a) to a reduced pressure value (94b) of between the nominal pressure value and the pressure threshold (94b) in the contraction 42, and further decreases to the pressure threshold (94c) in the diffuser 44. Hence, upon the mass flow rate value upstream of the venturi increasing from the nominal flow rate value to the graded flow rate value, the pressure in the line 30 decreases from the nominal pressure value to the pressure threshold, causing the valve 22 to move from the open position to the closed position. The venturi 40 can thus be described as being configured to receive the source flow at the nominal flow rate and the graded flow rate values, and sized such that the line pressure in the line 30 is greater than the pressure threshold upon the mass flow rate being at the nominal flow rate value and at the pressure threshold upon the mass flow rate being at the graded nominal flow rate value.

Other aspects of the present technology will now be described, albeit briefly as many of their respective elements correspond to some of the pneumatic system 1 described above. According to one such aspect, there is provided a venturi (such as the venturi 40) for an aircraft pneumatic system (such as the pneumatic system 1) having a source (such as the source 10) and a line 30 fluidly connected thereto. Absent the venturi 40, upon the mass flow rate of the source flow flowing from the source 10 and into the line 30 increasing from the nominal flow rate value to the graded flow rate value, i.e., an increase corresponding to the graded leakage rate threshold, the pressure inside the line 30 would decrease to a reduced pressure value greater than the pressure threshold. The venturi 40 is configured to be fluidly connectable to the pneumatic system 1 between its source 10 and its line 30 upstream of its actuator 20 so as to cause the pressure inside the line 30 to decrease to the pressure threshold upon the mass flow rate value increasing from the nominal flow rate value to the graded flow rate value. In view of the above description, it should be understood that connecting the venturi 40 to the pneumatic system 1 enables the detection of the leakage at the graded leakage rate threshold.

According to yet another aspect of the present technology, there is provided a method for sensing a fluid leakage occurring out of a line (such as the line 30) of an aircraft pneumatic system (such as the pneumatic system 1). The method comprises flowing the fluid from a source of the pneumatic system 1 (such as the source 10) into a venturi (such as the venturi 40) downstream of the source 10 and upstream of the line 30, and sensing the pressure in the line 30 (for example via the controller 60 of the pressure-monitoring means of the pneumatic system 1). In some embodiments, the method comprises, upon sensing the pressure inside the line being at the pressure threshold, sending a signal indicative of such to a monitoring system of the aircraft, display elements of which may be located in the cockpit. The display elements may be used to display an alert triggered upon receiving the signal. Hence, a relatively small pneumatic failure of the line 30 may be brought to the attention of aircraft personnel. For example, although the alert may indicate that the failure occurred at the valve 22, the method may include means to recognize that the failure concerns leakage out of the line 30. Such means may include carrying out verification procedures and using other aircraft fault detection systems, which may allow timely initiation of corrective action.

In some embodiments, the method comprises installing the venturi 40 in fluid communication between the source 10 and the line 30. In other embodiments, the method comprises installing the venturi 40 in the line 30 between the source 10 and a pneumatic apparatus (for example the valve 22). In some such embodiments, the venturi 40 is configured to be installed upstream of a portion of the line 30 to be monitored for leakage so as to protect heat-sensitive elements (for example the elements 70 in remote area 70a) in the vicinity of the line 30. Hence, the method may include identifying such portion of the line 30 and installing the venturi 40 upstream thereof. The method may also include configuring the venturi 40 based on properties (e.g., velocity, pressure and temperature) of the flow to be received thereby and on a heat transfer rate threshold above which the heat-sensitive structures are deemed prone to deterioration or failure.

In one particular embodiment, therefore, the present pneumatic system includes a venturi disposed between a pressure source and a line, wherein the venturi is configured to accelerate a flow inside the line, a pressure value in the line configured to detect when pressure in the line is less than a threshold indicative of a leakage occurring in the line at a corresponding rate.

The present invention proposes a pneumatic system, such as an anti-icing system in a bypass duct of a gas turbine engine that includes a cowl anti ice (CAI) valve and related actuation system, including a venturi choke orifice located near the pressure source in a servo line feeding pressurized air to a pneumatic valve for actuation of the valve. In one particular embodiment, the venturi choke orifice is sized such that a leak in the line downstream of the venturi office will result in a significant pressure loss across the venturi choke. This large pressure loss will be readily observable by the monitoring system of the engine and/or aircraft. Additionally, the venturi choke orifice also provides some amount of failure prevention, given that if a leak occurs in the air line downstream of the venturi choke office, the amount of flow through the line is limited by the venturi. The venturi choke orifice may be located as far upstream as possible, close to the pressure source (e.g. near the P3 air take-off). In one particular embodiment, however, the venturi choke orifice is located at the entrance of the pipe at the inlet of the bypass duct.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft pneumatic system comprising:
a line;
a pneumatic actuator fluidly connected to the line downstream of the line, the pneumatic actuator operable to switch between an operative position and an inoperative position, the actuator being in the operative position upon receiving a line pressure within the line above a pressure threshold and being in the inoperative position upon the line pressure being at or below the pressure threshold;
an indicator coupled to the pneumatic actuator, the indicator being indicative of whether the pneumatic actuator is in the operative position or in the inoperative position;
a pneumatic source operatively connected to the pneumatic actuator via the line, the pneumatic source having a source outlet providing a fluid flow at a source pressure greater than the pressure threshold;
a venturi having a venturi inlet fluidly connected to the source outlet and a venturi outlet fluidly connected to the line, the venturi sized relative to the pneumatic actuator and to the pneumatic source to pressurize the line such that the line pressure is:
at the source pressure upon the pneumatic source providing the fluid flow at a mass flow rate of a nominal flow rate value below a graded flow rate value, and
decreased from the source pressure to no more than the pressure threshold upon the mass flow rate having increased to at least the graded flow rate value.

2. A method of detecting a fluid leakage of a graded leakage rate occurring out of a line upstream of an aircraft pneumatic actuator, the method comprising:
controlling the aircraft pneumatic actuator to be in an operative position when a line pressure inside the line is above a pressure threshold and in an inoperative position when the line pressure is at or below the pressure threshold;
providing a flow of fluid from a pneumatic source upstream of the line at a source pressure greater than the pressure threshold;
choking the flow of fluid between the pneumatic source and the line such that the line pressure decreases from the source pressure to the pressure threshold upon a mass flow rate of the flow of fluid increasing from a nominal flow rate value by the graded leakage rate; and
sensing whether the aircraft pneumatic actuator is in the operative position or in the inoperative position, wherein the aircraft pneumatic actuator being in the inoperative position indicates that the fluid leakage of at least the graded leakage rate occurs out of the line.

3. The method of claim 2, further comprising decreasing the pressure inside the line from the nominal pressure value to the pressure threshold upon the mass flow rate increasing from the nominal flow rate value to a graded flow rate value.

4. The method of claim 3, further comprising ensuring that a difference between the graded flow rate value and the nominal flow rate value corresponds to the graded leakage rate.

5. The method of claim 2, further comprising, upon the mass flow rate being at the graded flow rate value, accelerating the fluid from a subsonic velocity value a supersonic velocity value.

6. The method of claim 2, further comprising, upon sensing that the aircraft pneumatic actuator is in the inoperative position, sending a signal indicative of the pressure inside the line to a pressure monitoring system of the aircraft.

7. The method of claim 2, further comprising, upon sensing that the aircraft pneumatic actuator is in the inoperative position, operating a valve of the aircraft pneumatic system downstream of the line so as to close the line.

\* \* \* \* \*